United States Patent Office 3,082,547
Patented Mar. 26, 1963

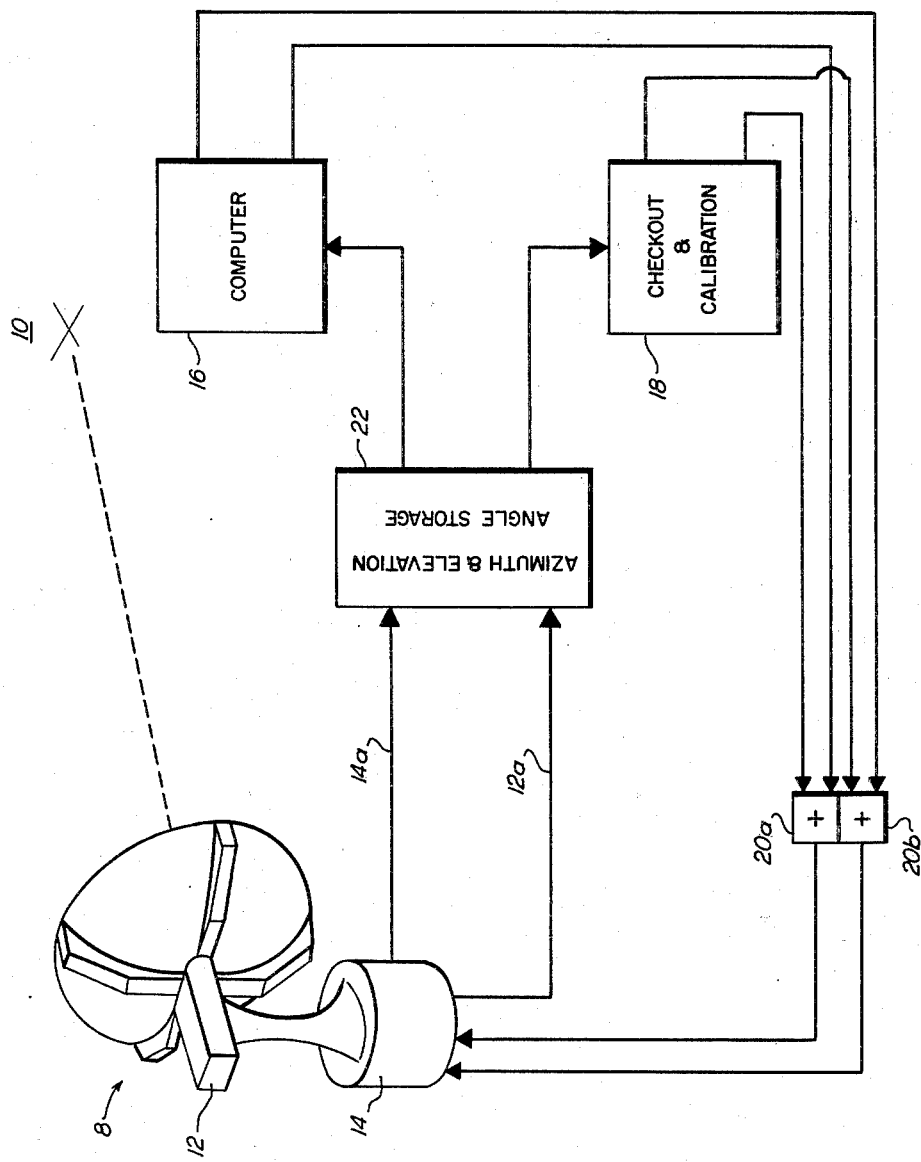

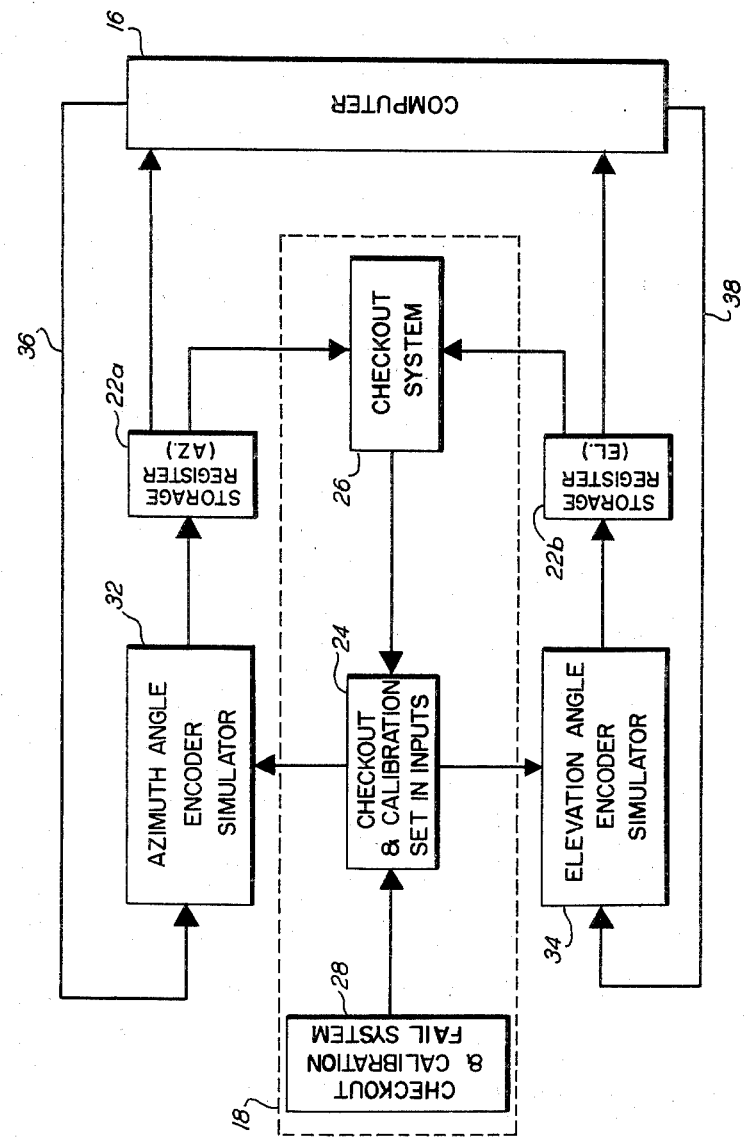

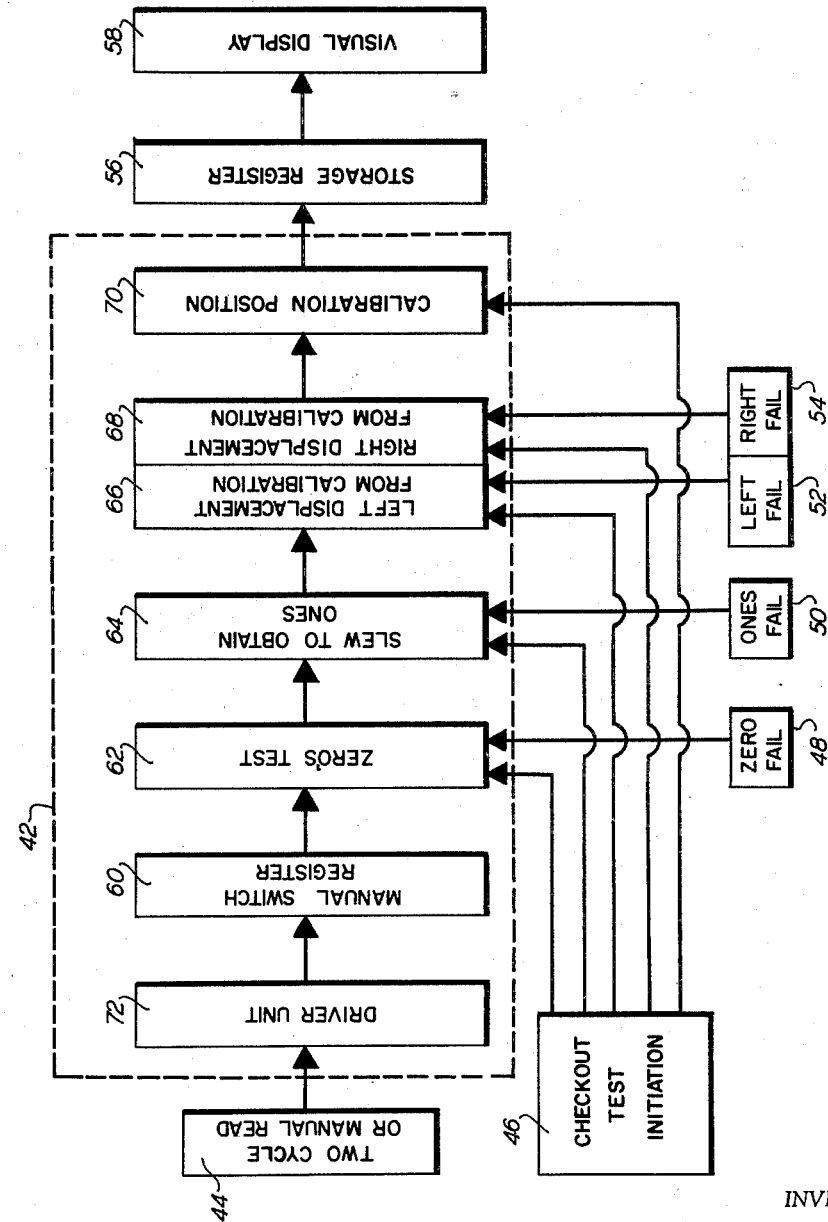

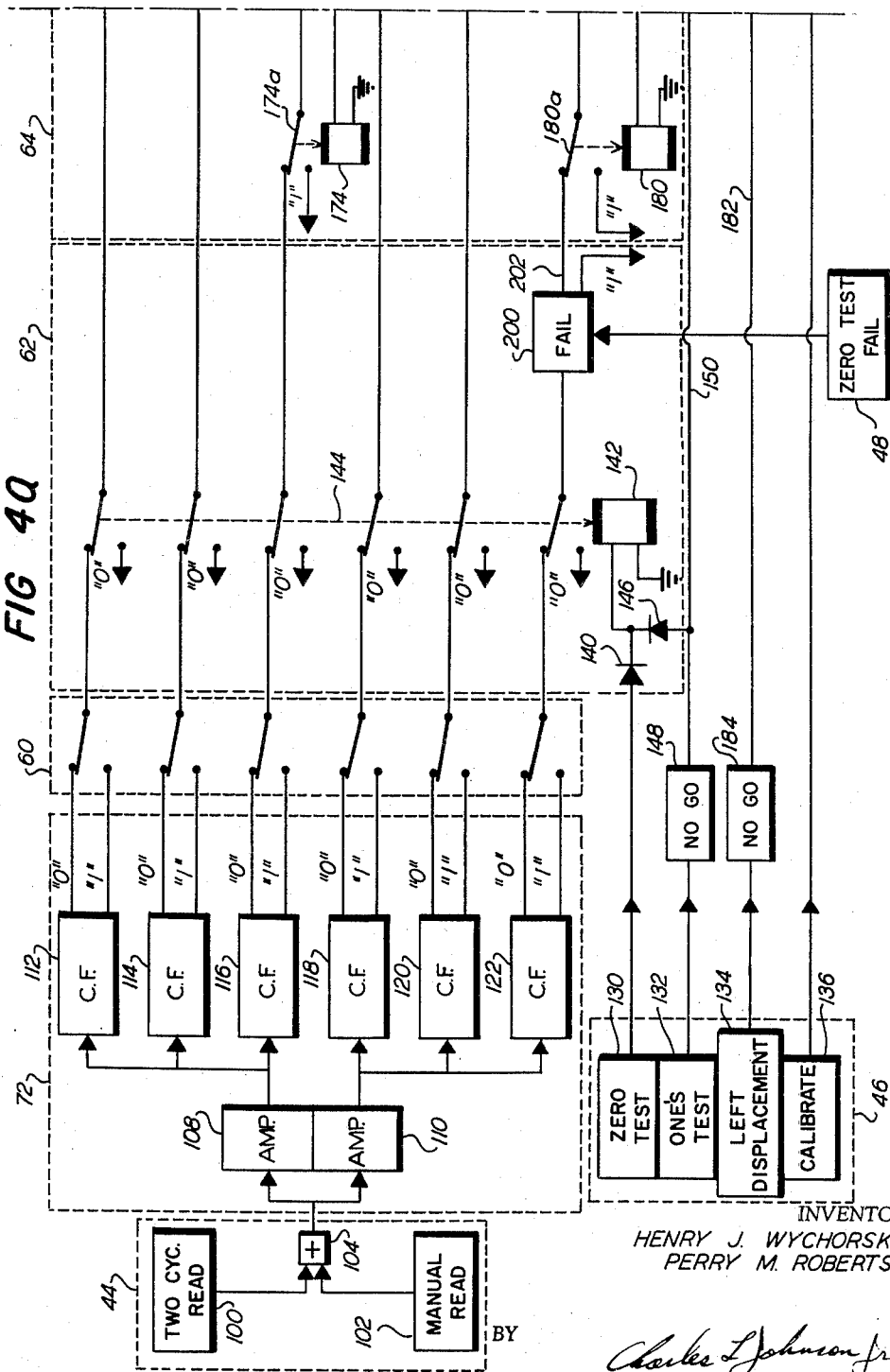

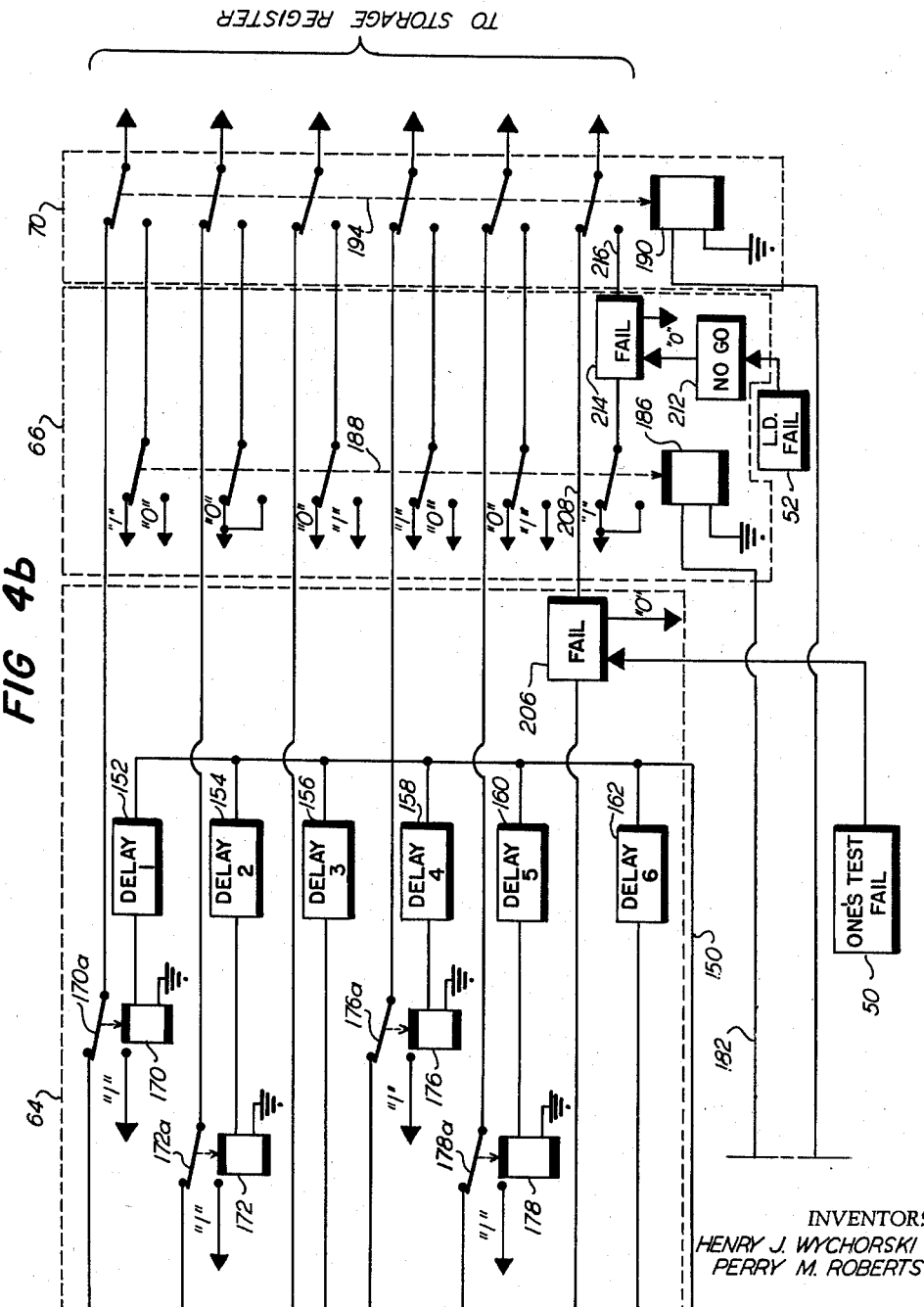

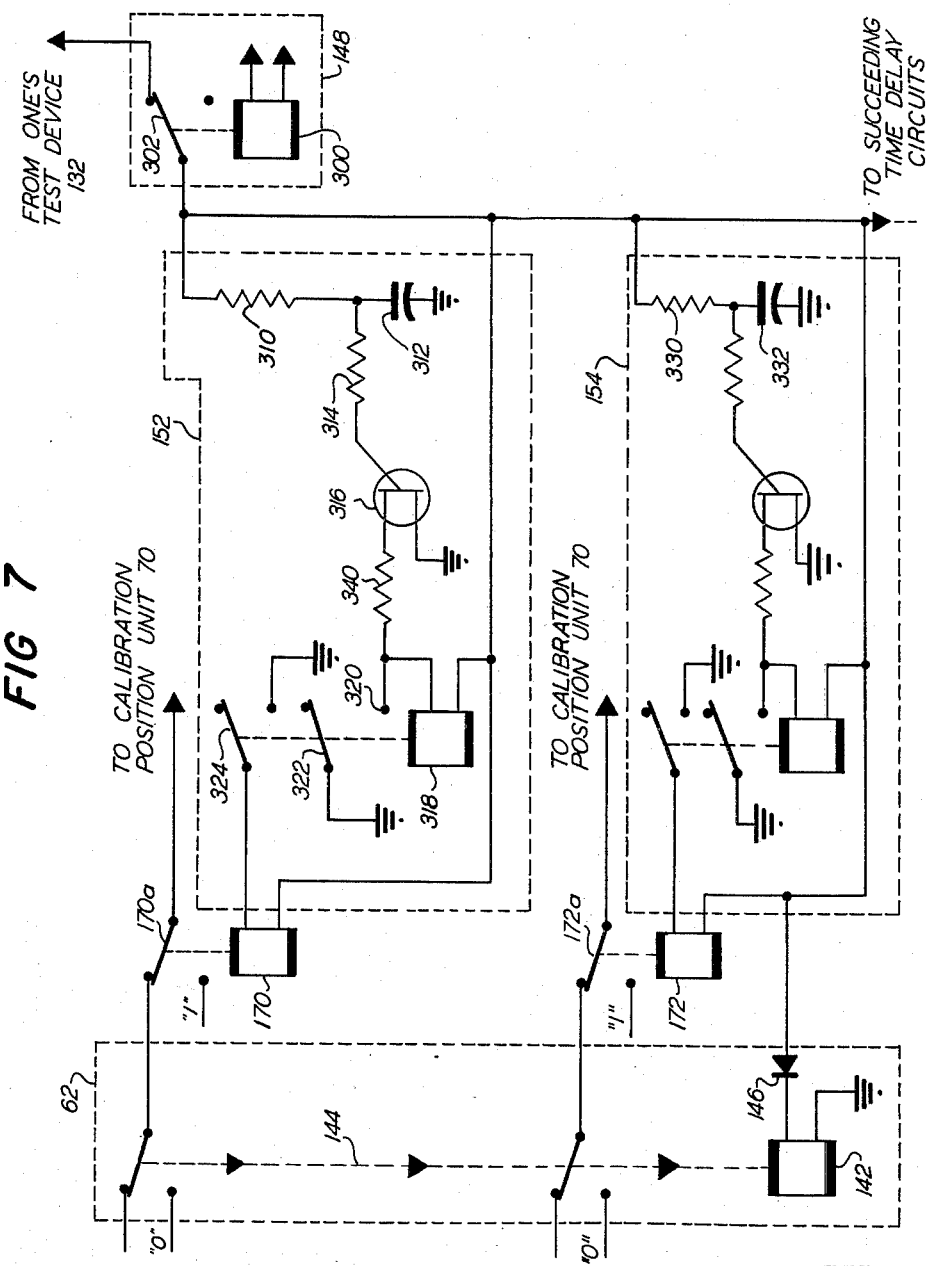

3,082,547
ANALOG TO DIGITAL ANGLE ENCODER SIMULATOR
Henry J. Wychorski, Framingham, Mass., and Perry M. Roberts, West Hyattsville, Md., assignors to ACF Industries, Incorporated, New York, N.Y., a corporation of New Jersey
Filed Mar. 18, 1960, Ser. No. 15,910
4 Claims. (Cl. 35—10.4)

This invention relates to radar systems and more particularly to the simulation of the analog-to-digital encoders utilized in radar antenna systems.

In many radar antenna systems which are used to track missiles or other devices it is necessary to determine accurately the azimuth and elevation position of the antenna. Generally, analog-to-digital encoders are employed to convert the angular position of the antenna into digital information in the form of a binary number. The encoder is connected to equipment which utilizes the digital information from the encoder to provide checking, indicating and correcting operations on the antenna system and the missile system. Radar antenna equipment of the nature referred to above is large and expensive. In training personnel to maintain and operate such equipment, it is expedient to employ simulating devices which can be made much smaller and cheaper than the radar equipment.

In order to minimize the expenses and spatial requirements of the actual radar antenna system for training personnel, the present invention provides an encoder simulator which is employed in place of the actual radar antenna and its associated encoders. The encoder simulator produces digital information indicative of actual operating conditions and applies this digital information to a portion of the antenna system equipment in a manner to simulate total system operation.

In an illustrative arrangement of the invention an encoder simulator includes a preprogrammed angular position circuit in which digital information is set up by preprogramming a number of switching units to represent specific angular positions of an antenna. This encoder simulator is employed in place of a majority of the radar antenna system equipment, and control devices are used to operate the switching units to simulate the operation of an entire antenna system, exclusive of the actual target tracking signals.

Another feature of the present invention lies in the provision of an analog-to-digital encoder simulator which produces digital information to simulate total system operation and which further includes means to modify the digital information to simulate predetermined errors in operation of an actual antenna system. This error simulation or synthesis is achieved by operating the encoder simulator to perform a specific simulated antenna operation and introducing an error into the encoder simulator so that operating personnel can be presented with normal operating conditions or with specific fail or error conditions representative of those encountered in operating an actual antenna system.

These and other features of this invention may be more fully appreciated when considered in the light of the following specification and drawings in which:

FIG. 1 is a radar antenna system representative of the type with which the device of the present invention may be employed;

FIG. 2 is a diagram of a simulated radar antenna system;

FIG. 3 is a detailed diagram of the azimuth angle encoder simulator of FIG. 2;

FIGS. 4a and 4b illustrate the simulator of FIG. 3;

FIG. 7 shows one of the test units of FIG. 3; and

Figure 5:
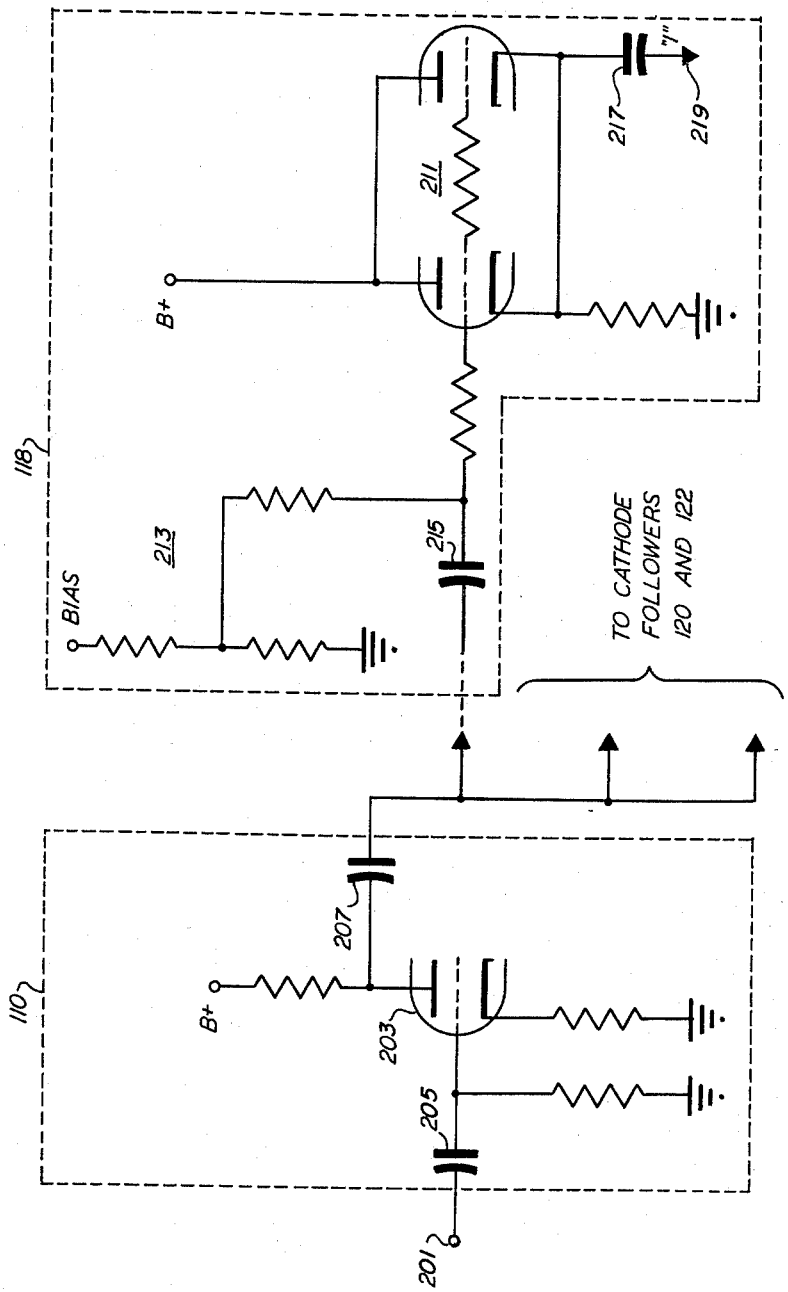
FIG. 5 illustrates the driver unit of FIG. 3.

FIG. 1 is a simplified illustration of a typical radar antenna system including an antenna unit, generally denoted by the reference numeral 8, for tracking a missile or similar object 10. An elevation angle position encoder 12 and an azimuth angle position encoder 14 are connected with the antenna unit 8 to convert the elevation angle and the azimuth angle, respectively, of the antenna into digital information in the form of binary numbers. These encoders are connected through lines 12a and 14a, respectively, to an azimuth and elevation angle storage unit 22. The output from the angle storage unit 22 is applied to a computer 16 and to a checkout and calibration system 18. The outputs from the computer 16 and the checkout and calibration system 18 are applied to the antenna unit 8 through OR circuits 20a and 20b, as will be explained in greater detail hereinafter.

In the operation of the system illustrated in FIG. 1 a separate radar system (not shown) is employed to control the antenna unit 8 to cause it to track the missile 10. The present invention is not concerned with this particular aspect, i.e., the actual tracking of the missile. During tracking the computer 16 may apply a read signal to the OR circuit 20a which triggers the elevation and azimuth encoders 12 and 14. When these encoders are triggered, the elevation and azimuth angles of the antenna are converted from analog to binary form and stored in the angle storage unit 22. The computer 16 subsequently receives this angle information and compares it with the programmed trajectory of the missile 10 to produce an error signal. This error signal from the computer 16 is applied to the OR circuit 20b to correct the flight of the missile 10, to correct the position of the antenna 8, or it may be used as an indication signal if desired. The checkout and calibration system 18 is employed to perform checks on the antenna system prior to launching of the missile. The checkout and calibration system 18 supplies a read signal to the OR circuit 20a to trigger the encoders 12 and 14. When these encoders are triggered, the azimuth and elevation angles of the antenna are stored in the storage unit 22 in binary form. The checkout and calibration system 18 also supplies specific signals through the OR circuit 20b to drive the antenna to desired positions and subsequently receives angle signals from the storage device 22 to determine if the antenna system is operating properly.

FIG. 2 shows a system similar to that illustrated in FIG. 1, but in FIG. 2 the antenna unit 8 and its associated equipment are simulated by an azimuth angle encoder simulator 32 and an elevation angle encoder simulator 34. The outputs from the encoder simulators 32 and 34 are connected to storage registers 22a and 22b, respectively. These two storage registers 22a and 22b correspond to the angle storage unit 22 in FIG. 1, although they are shown as separate storage devices. The outputs from the storage registers 22a and 22b are connected to the computer 16. The checkout and calibration system 18 includes a checkout and calibration setin input circuit 24 for applying checkout and calibration input signals to the encoders 32 and 34. A checkout system 26 is connected to the checkout and calibration setin input circuit 24 and this system correlates the input signals to the encoder simulators with the output signals from the storage registers 22a and 22b to determine if any error exists. A checkout and calibration fail system 28 is connected to the checkout and calibration setin input circuit 24 to provide specific fail conditions in the antenna system. The computer 16 is connected to the encoder simulators 32 and 34 through lines 36 and 38, respectively, to apply read signals which trigger the encoder simulators. When the encoder simulators 32 and 34 are triggered, their outputs are stored in the storage registers 22a and 22b, respectively.

In the operation of the device of FIG. 2 signals indicative of certain checkout and calibration tests are applied to the encoder simulators 32 and 34 from the checkout and calibration system 18. When either encoder simulator is triggered by a pulse from the computer 16 after signals are applied to the simulator from the system 18, the operation of the antenna unit and its associated encoders is simulated to provide a binary output representative of the information applied from the checkout and calibration system 18. This binary output is stored in the storage registers. As will appear hereinafter, the encoder simulators may be triggered by other devices without the aid of the computer 16. The checkout system 26 provides a means for comparing the outputs from the storage register 22a and 22b with the inputs applied to the encoder simulators from the checkout and calibration setin input circuit 24. Predetermined errors may be introduced into the encoder simulators from the checkout and calibration fail system 28. The outputs from the storage registers 22a and 22b may also be applied to the computer 16 for comparison with data in the computer.

The azimuth angle encoder simulator 32 in FIG. 2 includes the units illustrated in FIG. 3. The elevation angle encoder simulator 34 of FIG. 2 is essentially identical to the azimuth angle encoder simulator 32 with the exception that the nomenclature is different for the elevation unit. Hence, it is believed that a detailed illustration of the azimuth angle encoder simulator is also sufficient for a complete understanding of the elevation angle encoder simulator. The portion of the system illustrated in FIG. 3 that performs the actual simulation function is denoted by the reference numeral 42 and is referred to as an analog-to-digital converter simulator. The associated control and indication equipment also shown in FIG. 3 forms a part of the azimuth encoder simulator (FIG. 2). A checkout test initiation unit 46 is connected with the test units 62, 64, 66, 68 and 70 of the analog-to-digital converter simulator 42 to apply pulses to initiate the different test operations. Fail devices 48, 50, 52 and 54 are also connected with the simulator 42 to provide different fail conditions. Read or trigger pulses are supplied to a drive unit 72 of the simulator 42 from a two cycle or manual read unit 44. A manual switch register 60 is connected between the drive unit 72 and the test units to simulate different angular positions of an anantnna. The output from the simulator 42 is applied to a storage register 56 and a visual display unit 58 may be utilized for monitoring purposes in addition to applying this output to the storage register 22a in FIG. 2.

As will appear hereinafter the read unit 44 of FIG. 3 may apply either a two cycle read signal similar to that produced by the computer 16 (FIG. 2) or a manual read signal. If desired, the read signals supplied by the unit 44 may be provided from the computer 16 as illustrated in FIG. 2.

In operation, the simulator in FIG. 3 simulates the azimuth angle position encoder of a radar antenna system and introduces the binary bits normally supplied by the encoder. A manual switch register 60 is provided to simulate desired zero and one states of the encoder so that any desired angle may be simulated. During checkout the manual switch register 60 is switched out of the circuit and consequently the storage register 56 is supplied with a binary number or numbers representing the test in progress. The operation of the zeros' test unit 62 is initiated by the checkout test initiation unit 46 and the test unit 62 eliminates the encoder angle represented by the manual switch register 60 and supplies an all zero binary number to the storage register 56.

The slew-to-obtain ones' test unit 64 simulates the sweep of the antenna by initially supplying all zeros to the storage register 56 and subsequently applying ones until all ones are stored in the storage register 56. The left displacement and right displacement from calibration units 66 and 68, respectively, along with a calibration position unit 70 simulate the antenna's ability to return to a calibrate position. This operation is accomplished by switching in a binary number representing a calibrate position with the unit 70 and subsequently altering this binary number with the unit 66 or the unit 68 to simulate the proper displacement (left or right) from the calibrate position. The altered binary number is then removed and the calibrate position binary number is again presented to the simulator 42, thereby representing the return of the antenna to the calibrate position. In other words, when a simulated calibrate position for the simulated antenna and a simulated left or right displacement from the calibrate position are introduced into the system and subsequently this latter displacement signal is removed, then the system should return to the simulated calibrate position. The storage register 56 and the visual display unit 58 are used to monitor the operation of the azimuth angle encoder simulator. The storage register 56 and the visual display unit 58 are not illustrated in greater detail because each of these units is well known in the art. The visual display unit 58 may be one of the well known types in which a zero is indicated by no illumination of a lamp for a particular encoded bit while a one is indicated by the illumination of a lamp.

Referring now to FIGS. 4a and 4b, these figures taken together illustrate in greater detail the encoder simulator of FIG. 3, with the exception of the storage register 56 and the visual display unit 58 which are well known to those skilled in the art and are omitted for simplicity of illustration. The read unit 44 includes a two cycle read circuit 100 and a manual read circuit 102 which are both connected to an OR circuit 104 to supply read or trigger signals to the driver unit 72. The driver unit 72 includes a pair of driver amplifiers 108 and 110. The outputs from these amplifiers are connected to cathode followers 112, 114, 116, 118, 120 and 122. The outputs from the cathode followers are connected to the manual switch register 60 which applies binary bits from the cathode followers to the storage register 56 on six binary bit lines.

The checkout test initiation unit 46 comprises a zero test control device 130, a ones' test control device 132, a left displacement test control device 134 and a calibrate test control device 136. These test control devices supply a pulse or pulses to operate the relays in the zeros' test unit 62, the slew-to-obtain ones' unit 64, the left displacement-from-calibration unit 66 and the calibration position unit 70, respectively, to initiate a particular test.

The zero test control device 130 is connected through a diode 140 to a relay 142 which operates a multiple pole switch 144. The ones' test control device 132 is connected through a "no go" switch 148 and a diode 146 to the relay 142. This ones' test control device 132 is also connected through the "no go" switch 148 and a line 150 to delay circuits 152, 154, 156, 158, 160 and 162. These delay circuits are connected to relays 170, 172, 174, 176, 178 and 180 and these relays respectively operate switch arms 170a, 172a, 174a, 176a, 178a and 180a.

The left displacement control device 134 is connected through a "no go" switch 184 and a line 182 to a switching relay 186 which operates a multiple pole switch 188. The calibrate control device 136 is connected to a relay 190 which operates a multiple pole switch 194.

The zero test fail device 48 is connected to a fail circuit 200 which substitutes a one for a zero in line 202 during the zeros' test operation. The ones' test fail device 50 is connected to a fail circuit 206 which substitutes a zero for a one in line 208 during the ones' test procedure. The left displacement fail device 52 is connected through a "no go" switch 212 to a fail circuit 214 to substitute a zero for a one in line 216 during the left displacement test.

The right displacement-from-calibration unit 68 in FIG. 3 is not illustrated in FIG. 4b since its construction and operation are similar to the left displacement-from-calibration unit 66 with the exception that the code or binary number supplied to the storage register 56 from the right displacement-from-calibration unit is different.

The control devices 130, 132, 134 and 136, and the fail devices 48, 50 and 52 are circuits which supply a pulse or pulses to their associated test units and relays. Such circuits are well known to those skilled in the art and numerous circuits may be used for these devices; for example, a simple device would include a potential source and a switch.

According to a feature of this invention, in operating the simulator illustrated in FIGS. 4a and 4b the individual switch arms in the manual switch register 60 are connected to the upper zero line or to the lower one line of the cathode followers 112, 114, 116, 118, 120 and 122 in the driver unit 72 to supply any desired binary number indicative of a particular simulated angular position of an antenna to the storage register 56 (FIG. 3). The binary number is stored in the storage register whenever a read or trigger signal is applied from the read unit 44. The read signal may result from operation of the two cycle read circuit 100 which simulates the trigger pulses normally supplied by the computer 16 (FIG. 2). Alternatively, a single read pulse may be supplied from the manual read circuit 102 by manual operation which will be explained in greater detail subsequently. The read pulse or pulses from the read unit 44 are amplified by the amplifiers 108 and 110 and applied to the cathode followers 112, 114, 116, 118, 120 and 122. The cathode followers are used to provide a low impedance for the succeeding circuits and also to minimize the cross-talk between the binary bit lines. The output from the driver unit 72 is a series of positive pulses which are in parallel form and are emitted on each binary bit line simultaneously. When any of the switch arms in the manual switch register 60 are connected to a one line, a positive pulse is available on that particular line when a read signal is applied to the driver unit 72. When any of the switch arms in the manual switch register 60 are connected to a zero line, no pulse is available on that particular line. Hence, it should be apparent that the positions of the individual switch arms in the manual switch register 60 determine the binary number that is applied to the storage register 56 when a read pulse is applied to the driver unit 72. This binary number is indicative of a simulated antenna angle which may be displayed on the visual display unit 58 (FIG. 3) or compared with check out and calibration set in inputs by the checkout and calibration system 18 (FIG. 2) described before.

According to another feature of the present invention, the encoder simulator shown in FIGS. 4a and 4b may simulate a number of tests which are initiated by operating the checkout test initiation unit 46. When performing a zeros' test, the zero test control device 130 supplies a pulse to the relay 142 which causes each of the switch arms of the switch 144 to contact the zero lines. This operation of the switch 144 bypasses the manual switch register 60 and supplies a binary number of all zeros (000000) to the storage register 56, and simulates a particular angle for the antenna, usually zero. During the zeros' test a fail condition may be introduced into the encoder simulator by applying a pulse to the fail circuit 200 from the zero test fail device 48. This action substitutes a one for a zero that previously existed on the line 202 and indicates that an error has occurred in the encoder simulator indicative of the type of error that may occur in an actual radar antenna system.

In order to perform the ones' test the ones' test control device 132 supplies a pulse to the relay 142 through the diode 146. The control device 132 also supplies a pulse to the delay circuit 152, 154, 156, 158, 160 and 162 through the line 150. The purpose of the "no go" relay 148 is to stop the ones' test by preventing a pulse from the control device 132 from affecting the delay circuits and the relay 142 when an error is detected by the checkout and calibration system 18 (FIGS. 1 and 2). When the relay 142 is energized, the switch 144 moves to its lower position, thereby bypassing the manual switch register 60 and supplying a binary number of all zeros to the storage register. The delay circuits 152, 154, 156, 158, 160 and 162 provide time delays so that the relay 170 is first energized followed by the relay 172, then the relay 174, etc. This delayed operation of the relays 170, 172, 174, 176, 178 and 180 simulates the sweep of the antenna by progressively applying a one to each of the binary bit lines. The time delay periods of the delay circuits are chosen such that the sweep of all of the bits into the one state is achieved in a given period of time.

Provision is also made in the simulator of FIGS. 4a and 4b to introduce an error during the ones' test. The ones' test fail device 50 supplies a pulse to the fail circuit 206 which applies a zero to the line 208. This operation prevents the ones' state from being achieved. When this latter event takes place, the checkout and calibration system 18 (FIGS. 1 and 2) operates the "no go" relay 148 and permits the ones' test to be repeated.

As noted before only the azimuth angle encoder simulator is illustrated in detail (FIGS. 4a and 4b) since the elevation angle encoder is essentially identical except for nomenclature. The binary numbers used in each simulator may be the same or different as desired.

The left displacement-from-calibrate position test is performed by operating the calibrate control device 136 and the left displacement control device 134. The calibrate control device 136 applies a pulse to the relay 190 thereby causing the switch 194 to move to its lower position. When the switch 194 is in the lower position and the switch 188 is in its upper position, a binary number indicative of a simulated calibrate position is entered into the storage register. This binary number is determined by the one and the zero lines connected to the contacts of the switch 188. As illustrated, a binary number 100101 is employed, but any desired number may be used. The left displacement control device 134 applies a pulse through the "no go" switch 184 and the line 182 to the relay 186. The relay 186 causes the switch 188 to move to its lower position and apply a different binary number (001011 illustrated) to the storage register 56. This simulates the displacement of the antenna to the left. Subsequently, the relay 186 is de-energized allowing the switch 188 to return to its upper position which simulates a return of the antenna to its calibrate position. This test simulates the movement of the antenna to a specific calibrate position for alignment purposes, its ability to move to the left and its ability to return to the calibration position.

Provision is made to introduce a fail condition during the left displacement-from-calibrate position test. As will appear in greater detail hereinafter this is achieved by applying a pulse to the fail circuit 214 from the left displacement fail device 52. When the fail circuit 214 is operated, it applies a zero to the line 216. This fail condition simulates the antenna's failure to return to a calibrate position by altering the last bit in the binary number applied to the storage register. When this event occurs, the checkout and calibration system 18 (FIGS. 1 and 2) operates the "no go" relay 212.

For clarity of illustration the right displacement-from-calibrate position unit 68 and its associated right fail device 54 is not shown in FIG. 4b. The unit 68 and the device 54 are essentially identical to the unit 66 and the device 52. The unit 68 is connected between the unit 66 and the calibration position unit 70. The only difference between the unit 68 and the unit 66 is in the binary number supplied during the right or left displacement-from-calibration position tests.

It is to be understood that although only six binary bit lines are illustrated in FIGS. 4a and 4b to supply a six bit code to the storage register, more or less lines may be employed in connection with different codes as desired. Furthermore, the individual relays, such as 170, 172, etc., in the slew-to-obtain ones' unit 64 may utilize more than one switch arm to change the bit on more than one line at a time if desired.

Since the overall operation of the simulator has been described in detail above, certain of the individual circuits and devices included within the simulator are now considered to give a more detailed understanding of the present invention. FIG. 5 illustrates the amplifier 110 and the cathode follower 118 in the driver unit 72 shown in FIG. 4a. Only one amplifier and one cathode follower is illustrated in detail since it is believed that this is sufficient to obtain a complete understanding of the overall operation of the driver unit 72. The OR circuit 104 (FIG. 4a) is connected to a terminal 200. The terminal 201 is connected to the grid of a tube 203 through a coupling capacitor 205. The plate of the tube 203 is connected through a coupling capacitor 207 to the cathode follower 118. The cathode follower 118 includes a double troide 211, and a bias network 213 with an input coupling capacitor 215 therefor. The cathode follower supplies a one output through a coupling capacitor 217 to a terminal 219. A zero output (not shown) which is at ground potential is provided by the cathode follower 118. The amplifier 110 is also connected to the cathode followers 120 and 122. In the event that a larger number of binary bit lines are employed the amplifier 110 may supply additional cathode followers or an additional amplifier similar to 110 may be employed. Furthermore, only one amplifier 110 may be employed to supply all of the cathode followers 112, 114, 116, 118, 120 and 122 (FIG. 4a).

The amplifier 110 amplifies the read or trigger pulses applied to the terminal 201. The amplified output pulse is distributed to the cathode followers 118, 120 and 122 which provide a one output pulse at the terminal 219 when a trigger pulse is applied to the terminal 201 of the amplifier 110. The cathode followers are employed to establish a low impedance for the succeeding circuits of the simulator (FIG. 4) and to minimize the cross-talk between the various binary bit lines.

Figure 6:
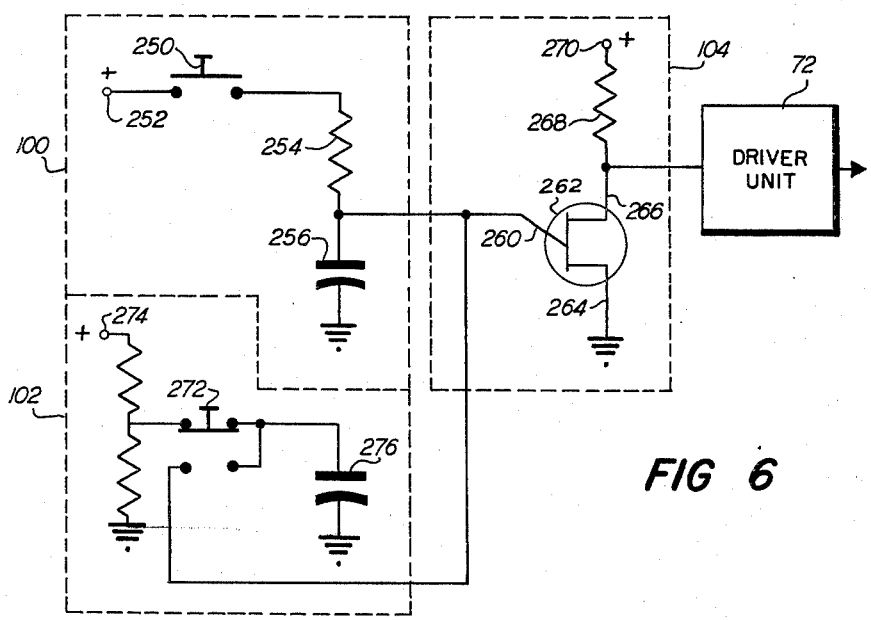
FIG. 6 illustrates the two cycle or manual read device of FIG. 3.

The two cycle or manual read unit 44 shown in FIGS. 3 and 4a is illustrated in detail in FIG. 6. A manual switch 250 is connected between a positive D.C. potential terminal 252 and an RC circuit including a resistor 254 and a capacitor 256. The resistor 254 and the capacitor 256 are connected to the emitter 260 of an unijunction transistor 262. A first base 264 of the transistor 262 is connected to ground and a second base 266 is connected through a resistor 268 to a positive D.C. potential terminal 270 and also to the driver unit 72. The manual read circuit 102 includes a switch 272 connected to a voltage divider which is connected between a positive D.C. potential terminal 274 and ground. The switch 272 is also connected to a capacitor 276. The switch 272 is arranged to connect the capacitor 276 to the emitter 260 of the transistor 262 when the switch 272 is moved to its lower position.

When the two cycle read circuit 100 is operated, it simulates the read pulses normally supplied by the computer 16 (FIGS. 1 and 2). The switch 250 applies a positive D.C. potential to the RC circuit which comprises the resistor 254 and the capacitor 256. The time constant of the RC circuit establishes the read rate. The RC circuit supplies a breakdown voltage between the first base 264 and the emitter 260 of the transistor 262. This breakdown voltage changes the impedance between the emitter 260 and the first base 264 from a high impedance to a low impedance and allows the capacitor 256 to discharge. As a result of this operation the OR circuit 104 applies a pulse to the driver unit 72. As long as the switch 250 remains closed read pulses are applied to the driver unit 72.

The manual read circuit 102 provides a means for applying a single trigger pulse to the driver unit 72. When the switch 272 is in the upper position as illustrated, the capacitor 276 charges to a voltage of approximately one-half (some value greater than the breakdown voltage of the transistor 62) of the potential applied to the terminal 274. When the switch 272 is moved to its lower position, the capacitor 276 is connected across the emitter 260 and the first base 264 of the transistor 262. The capacitor 276 is discharged by the breakdown of the transistor and a pulse is applied to the driver unit 72. When the switch 272 is returned to its upper position, the capacitor 276 is again charged and consequently is available for the next manual activation of the switch 272.

FIG. 7 illustrates the delay circuits in the slew-to-obtain ones' unit 54 of the simulator in FIGS. 4a and 4b. Each of the delay circuits is essentially identical in construction and therefore only two of the delay circuits 152 and 154 are illustrated in detail. The ones' test control device 132 (FIG. 4a) is connected to the "no go" switch 148 which includes a relay 300 and a switch arm 302. The "no go" switch 148 is connected through the delay circuits 152 and 154 to the relays 170 and 172, respectively. The "no go" switch 148 is also connected to the relay 142 (FIG. 4a) in the zeros' test unit 62 as described before. The delay circuit 152 includes a resistor 310 and a capacitor 312 to establish the time delay of the circuit. The resistor 310 and the capacitor 312 are connected through a limiting resistor 314 to the emitter of an unijunction transistor 316. One of the bases of the transistor 316 is connected to ground and the other base is connected through a resistor 340 to a sensitive relay 318. This latter base is also connected to a terminal 320 of a relay holding circuit switch arm 322. The relay 170 is connected to a switch arm 324 in the delay circuit 152.

The delay circuit 154 is identical to the delay circuit 152 with the exception of the values of a resistor 330 and a capacitor 332 which determine the time delay in the delay circuit 154. These resistors and capacitors of each delay circuit are different in order that each subsequent delay circuit has a longer time delay than that of the preceding delay circuit.

When the slew-to-obtain ones' test is initiated, the capacitor 312 is charged to the breakdown voltage of the unijunction transistor 316. The subsequent change in impedance between the two bases of the transistor 316 causes sufficient current to energize the sensitive relay 318. The resistor 314 is of a sufficient magnitude to slow down the discharge of the capacitor 312 in order to allow the relay 318 to operate. The resistor 340 is employed to establish the proper impedance level across the two bases of the transistor.

When the relay 318 is energized, the switch arms 322 and 324 move to their lower position. The switch arm 322 provides a holding circuit for the relay 318 to maintain this relay in an energized condition after the capacitor 312 discharges. The switch arm 324 provides a ground return path for the relay 170 thereby allowing that relay to become energized and operate the switch arm 170a. The operation of the delay circuit 154 is the same as the operation of the delay circuit 152 with the exception that the delay circuit 154 has a longer time delay. As described previously the relay 300 of the "no go" switch 148 is energized from the checkout and calibration system 18 (FIGS. 1 and 2) if an error occurs during the ones' test. It is noted here that although the relay 170 and the other corresponding relays are each illustrated as controlling only one of the binary bit lines, they may switch more than one of these lines if this operation is desired.

Figure 8:
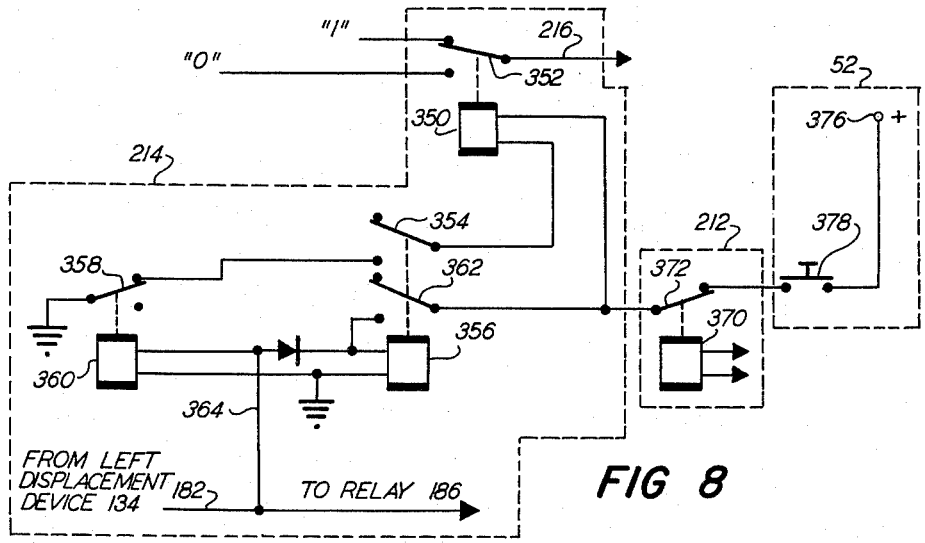
FIG. 8 illustrates one of the fail units of FIG. 4b.

FIG. 8 illustrates the left displacement fail circuit 214 (FIG. 4b). The left displacement fail device 52 is connected through the "no go" switch 212 to the fail circuit 214. The fail circuit 214 includes a relay 350 which operates a switch arm 352. The relay 350 is connected to a switch arm 354 which is operated by relay 356. When the relay 356 is energized, the relay 350 is connected to a switch arm 358 which is operated by a relay 360. A switch arm 362, which is operated by the relay 356, is connected to the "no go" switch 212. The relays 356 and 360 are connected through a line 364 to a line 182 which connects the left displacement control device 134 with the relay 186 in the left displacement-from-calibrate position unit 66 (see FIGS. 4a and 4b). The "no go" switch 212 includes a relay 370 and a switch arm 372. The relay 370 is connected (not shown) to the checkout and calibration system 18 (FIGS. 1 and 2) to be operated thereby. The left displacement fail device 52 includes a switch 378 and a terminal 376 which is connected to a positive potential source.

The left displacement-from-calibrate position fail circuit 214 illustrated in FIG. 8 is operated during the left displacement-from-calibrate position test. After the left displacement-from-calibrate position test is performed the switch 378 is closed. The left displacement control device 134 (FIG. 4a) again applies a pulse to the relay 186 (FIG. 4b) through the line 182. In addition to energizing the relay 186 as explained in connection with FIGS. 4a and 4b, this pulse energizes the relays 356 and 360. When the relays 356 and 360 are energized, the switch arms 362, 354 and 358 move to their lower positions. Upon the subsequent termination of the pulse from the left displacement control device 134 through the line 182, the relay 360 is de-energized, but the relay 356 remains energized since the switch arm 362 provides a holding circuit for the relay 356. When the switch arm 358 returns to its upper position, the relay 350 becomes energized because the switch arm 354 is held in its lower position by the relay 356. When the relay 350 is energized, the switch arm 352 moves to its lower position thereby applying a zero to the line 216. Since during the normal operating condition a one is applied to the line 216, a zero on this line simulates the condition of the antenna not having returned to the calibrate position. Although the fail circuit 214 is illustrated as applying a zero to only one of the binary bit lines 216, it may switch and apply a zero to more than one of these lines if desired.

From the foregoing description it is now apparent that the encoder simulator of the present invention simulates certain operating, testing and fail conditions that may take place in an actual radar antenna system. The encoder simulator is used in place of the normal encoder or encoders and in place of the antenna itself. The encoder simulator produces digital information which is representative of actual operating conditions and applies this digital information to a portion of the antenna system equipment in a manner to simulate the total system operation. Additionally, the encoder simulator includes means to modify the digital information to simulate predetermined errors in operation of an actual antenna system. Hence, an encoder simulator is provided by the present invention which may be used in place of large and expensive antenna equipment to train personnel by presenting numerous of the actual operating conditions present in a radar antenna system.

What is claimed is:

1. An encoder simulator for simulating the operation of a movable antenna system having digital angle encoders, said simulator comprising a read unit for producing triggering pulses, a driver unit connected to amplify pulses from said read unit, a switch register connected to said driver unit to establish signals representative of binary numbers corresponding to angular positions of the antenna system, a storage register connected to said switch register for storing said signals, a first test unit connected to said storage register for bypassing said switch register and establishing signals representative of a particular binary number, a second test unit connected to said storage register for establishing signals representative of progressing binary numbers which vary from a first value to a second value to simulate antenna scanning, a test means connected to said storage register for establishing signals indicative of a third binary number, at least a fourth binary number and subsequently said third binary number, a first fail device connected to said first test unit for altering the signals representative of the binary number established by said first test unit, a second fail device connected to said second test unit for altering the signals representative of the binary number of said second value established by said second test unit, and a fail means connected to said test means for altering at least the signals indicative of one of the binary numbers established by said test means, and means connected to selectively operate said first test unit, said second test unit and said test means.

2. Apparatus according to claim 1, wherein said switch means includes a plurality of manually operable switches, there being one of said switches for each digit of said binary numbers.

3. A simulator according to claim 1 including means responsive to said second fail device for stopping the operation of said second test unit.

4. A simulator according to claim 1 including means responsive to said fail means for stopping the operation of said test means.

References Cited in the file of this patent

UNITED STATES PATENTS

| | | |
|---|---|---|
| 2,548,684 | Roth | Apr. 10, 1951 |
| 2,555,442 | Haler | June 5, 1951 |
| 2,771,593 | Straehl | Nov. 20, 1956 |
| 2,774,149 | Garman et al. | Dec. 18, 1956 |
| 2,811,789 | Paine | Nov. 5, 1957 |
| 2,864,557 | Hobbs | Dec. 16, 1958 |
| 2,870,429 | Hales | Jan. 20, 1959 |
| 2,922,157 | McShan | Jan. 19, 1960 |
| 2,952,848 | Zahalka | Sept. 13, 1960 |